(12) United States Patent
Sweeney

(10) Patent No.: US 11,522,917 B2
(45) Date of Patent: Dec. 6, 2022

(54) SCALABLE NETWORK PROCESSING SEGMENTATION

(71) Applicant: Arista Networks, Inc., Santa Clara, CA (US)

(72) Inventor: Adam James Sweeney, San Jose, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 247 days.

(21) Appl. No.: 16/898,020

(22) Filed: Jun. 10, 2020

(65) Prior Publication Data

US 2021/0392167 A1 Dec. 16, 2021

(51) Int. Cl.
*H04L 9/40* (2022.01)
*H04L 45/748* (2022.01)
*H04L 45/00* (2022.01)
*H04L 45/745* (2022.01)

(52) U.S. Cl.
CPC .............. *H04L 63/20* (2013.01); *H04L 45/34* (2013.01); *H04L 45/748* (2013.01); *H04L 45/74591* (2022.05); *H04L 63/101* (2013.01)

(58) Field of Classification Search
None
See application file for complete search history.

(56) References Cited

U.S. PATENT DOCUMENTS

| | | | |
|---|---|---|---|
| 2004/0022257 A1* | 2/2004 | Green | H04L 12/4641 370/401 |
| 2009/0198952 A1 | 8/2009 | Khmelnitsky et al. | |
| 2014/0161131 A1 | 6/2014 | Yang et al. | |
| 2014/0169365 A1 | 6/2014 | Sundaram et al. | |
| 2016/0173445 A1* | 6/2016 | Mosko | H04L 45/748 370/392 |
| 2016/0254999 A1 | 9/2016 | Labonte et al. | |

(Continued)

OTHER PUBLICATIONS

International Search Report and Written Opinion for International Appln. No PCT/US2021/036865 dated Sep. 21, 2021, 8 pages.

(Continued)

*Primary Examiner* — Xavier S Wong
(74) *Attorney, Agent, or Firm* — Fountainhead Law Group, P.C.

(57) ABSTRACT

A method for processing network communications, the method including receiving a network packet at a network device and performing at least one lookup for the packet in one or more first lookup tables in which the one or more first lookup tables are programmed to include at least one of an exact match or longest prefix match (LPM) table entry. The method includes obtaining a security source segment and a security destination segment based upon the result of the at least one lookup for the packet in the one or more first lookup tables. The method further includes performing a lookup in a second lookup table based upon the security source segment and security destination segment in which the second lookup table is programmed in a content addressable memory. Based upon the result of the lookup in the second lookup table, processing a forwarding decision for the packet according to the security source segment and security destination segment.

30 Claims, 9 Drawing Sheets

(56) References Cited

U.S. PATENT DOCUMENTS

2019/0044859 A1    2/2019  Sundar et al.
2019/0222500 A1*  7/2019  Nainar .................... H04L 45/50
2020/0267082 A1*  8/2020  Dong ...................... H04L 45/02
2021/0029036 A1*  1/2021  Ghanwani ........... H04L 12/4633

OTHER PUBLICATIONS

El-Atawy et al. "Using online traffic statistical matching for optimizing packet filtering performance", IEEE INFOCOM 2007—26th IEEE International Conference on Computer Communications,May 12, 2007, Retrieved on Aug. 15, 2021 from https:I/ieeexplore.ieee.org/abstract/document/4215688; 12 pages.
"ACLs and Route Maps", Chapter 24, Access Control Lists, pp. 1233-1353, Jun. 17, 2019 (120 pages).
"Multi-Chassis Link Aggregation", Chapter 13, MLAG Introduction, pp. 655-694, Jun. 17, 2019 (40 pages).

* cited by examiner

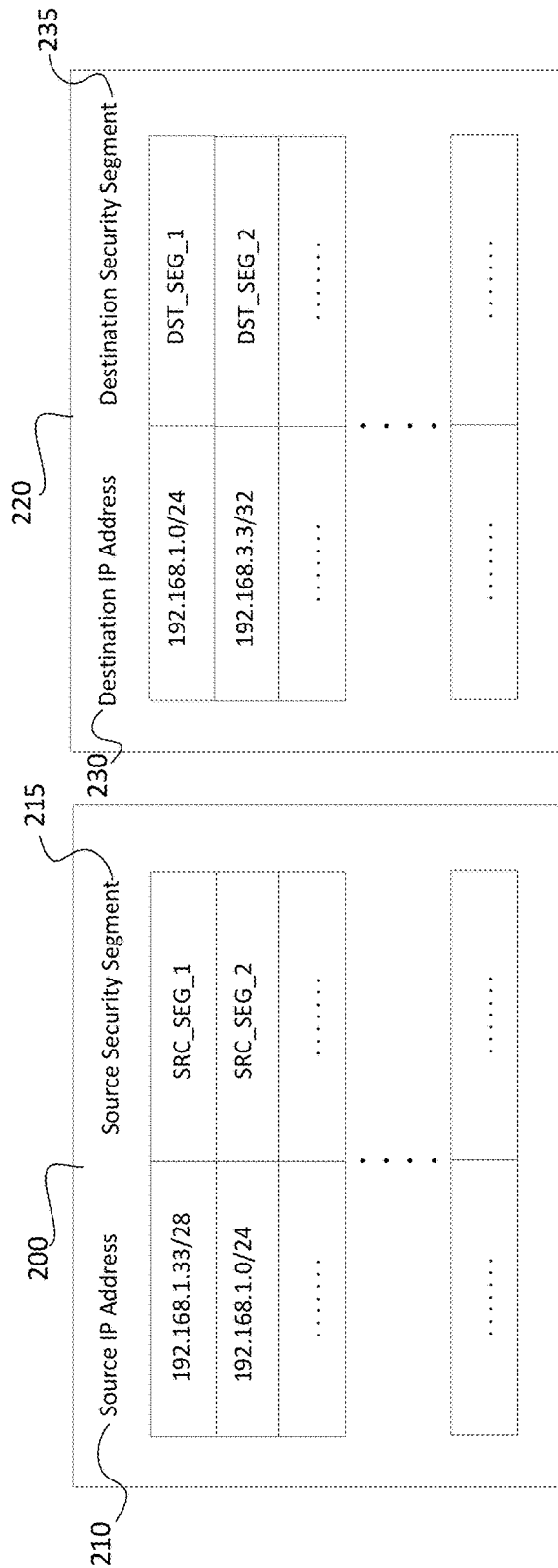
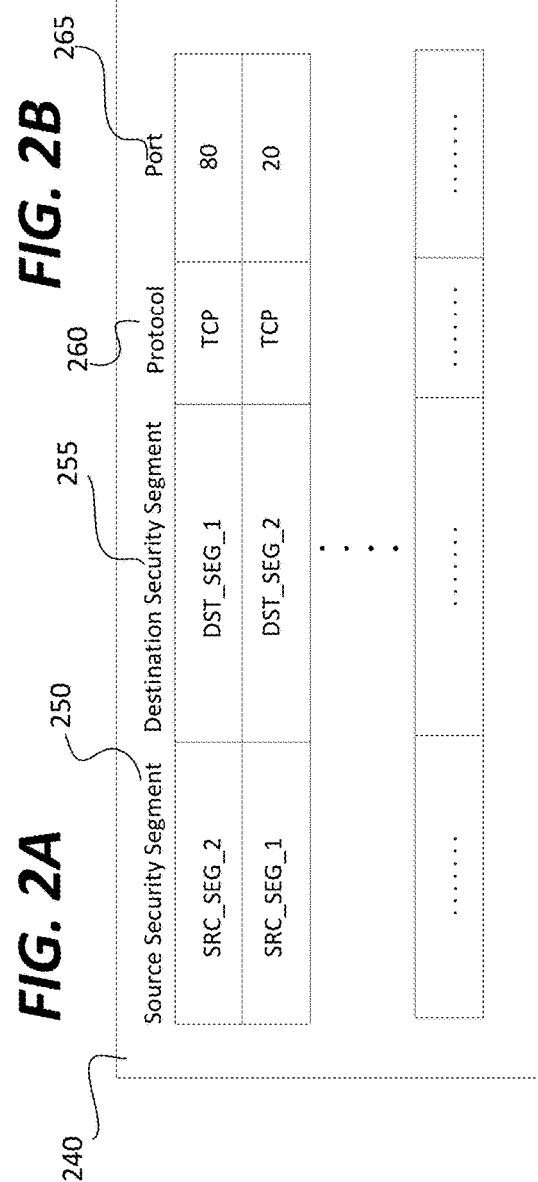
FIG. 2A
FIG. 2B
FIG. 2C

| Flow Table | |
|---|---|
| Match Fields | Actions |
| src_ip=192.168.1.33/28 | count, goto_table: 1, assign SRC_SEG_1 |
| src_ip=192.168.1.0/24 | count, goto_table:2, assign SRC_SEG_2 |
| dst_ip=192.168.1.0/24 | assign_dest_port: 2, assign DST_SEG_1 |
| dst_ip=192.168.3.3/32 | assign_dest_port: 1, assign DST_SEG_2 |

*FIG. 8C*

SCALABLE NETWORK PROCESSING SEGMENTATION

BACKGROUND

Security in computer networks is becoming more critical and complex as networks become more relied upon for communications in a variety of applications. Security functions can, however, require large hardware lookup tables in network switches. Implementing large hardware lookup tables in network switches is expensive and sometimes infeasible. Balanced solutions are therefore needed for both security and efficient network switch design.

Access control lists (ACLs) have been implemented in network devices to implement security policies including blocking or filtering unauthorized or potentially harmful network traffic from reaching or accessing particular network destinations. ACLs may be implemented in a router or switch, for example, where lists or tables of source and/or destination network addresses are programmed to permit or deny communications from being routed to particular destination addresses from particular source addresses. Especially in large networks, hundreds of thousands of IP addresses may need to be securely processed.

Because ACLs are generally implemented on an address-by-address basis for each packet received in a device, and in order to process and filter network traffic rapidly, ACLs and forwarding operations are typically implemented in specialized memory tables (e.g., content addressable memory (CAM) or ternary content addressable memory (TCAM)). CAMs and TCAMs permit fast parallel lookup but are expensive and occupy a large footprint. Use of such specialized memory tables may need to be heavily leveraged, particularly in large networks, because they are also frequently used for other functions demanding rapid rates of processing. Thus, more efficient and effective methods are needed for securely processing network communications.

BRIEF DESCRIPTION OF THE DRAWINGS

Various objects and advantages of the disclosure will be apparent upon consideration of the following detailed description, taken in conjunction with the accompanying drawings, in which like reference characters refer to like parts throughout, and in which:

FIG. 2A is an exemplary forwarding table for assigning source security segments according to some embodiments;

FIG. 2B is an exemplary forwarding table for assigning destination security segments according to some embodiments;

FIG. 2C is an exemplary security segment lookup table according to some embodiments;

FIG. 8C is an exemplary forwarding table programmed for assigning security segments according to some embodiments.

DETAILED DESCRIPTION

Figure 1:
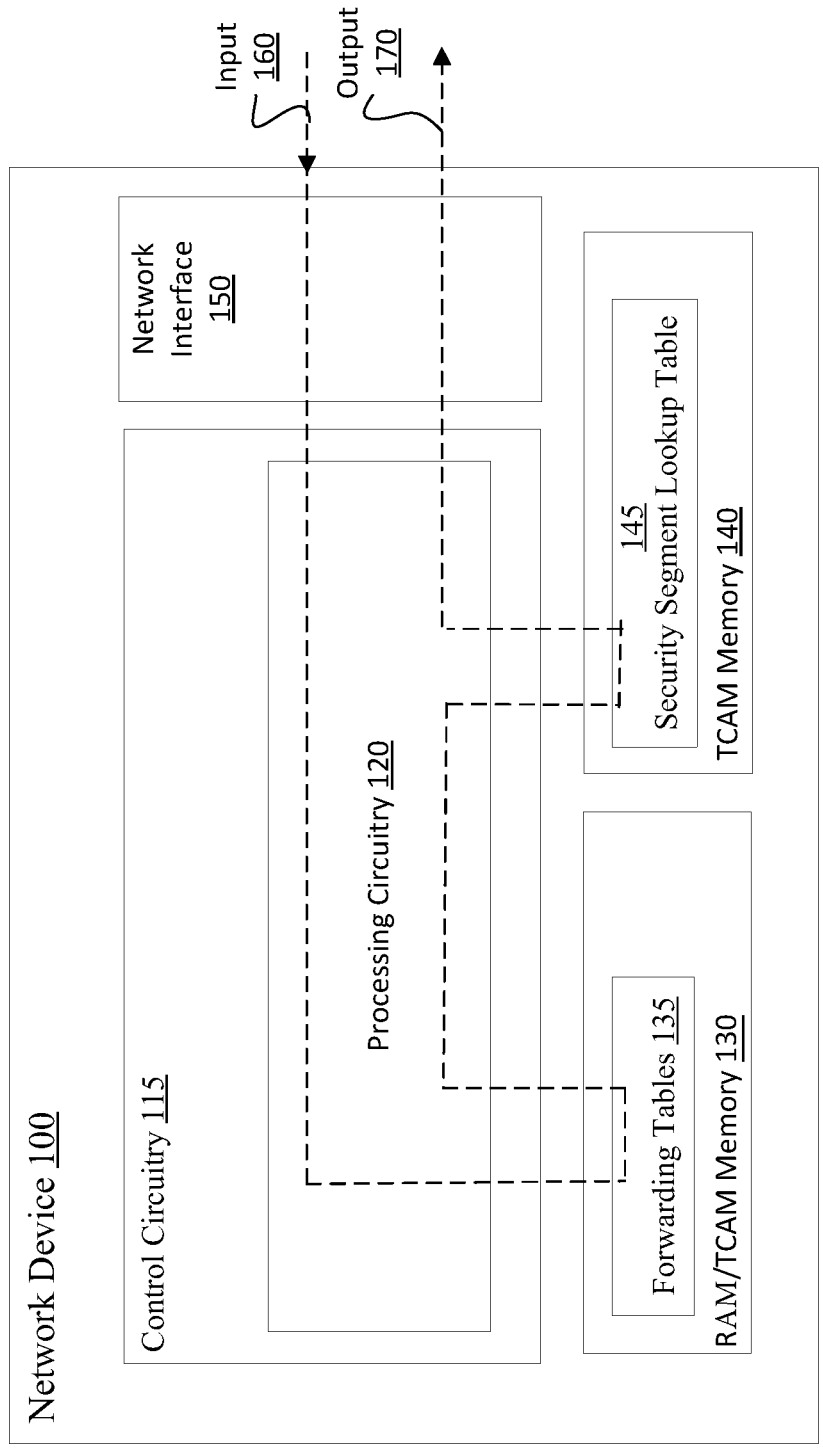
FIG. 1 is a block diagram of a network device configured to perform segmentation processing according to some embodiments.

In some approaches described herein, a more efficient use of compact/dedicated memory for secure network processing is performed by assigning packets to security segments using large table lookups (e.g., in RAM, CAM, and/or TCAM) and subsequently processing security segment lookups in compact/dedicated memory tables (e.g., CAM/TCAM). In this manner, keys (e.g., network processing qualifiers) in the compact/dedicated tables can be consolidated based upon a security segment that may apply to numerous source and/or destination IP addresses, ports, or protocols and save premium space within the CAM/TCAM tables. Accordingly, a reduction in entries in the compact tables may be accomplished while processing substantially the same volume of secure transactions. This can lead to more efficient use of the processing hardware resources generally used to store the compact tables and overall more efficient, secure processing of network traffic, particularly in large networks with numerous devices utilizing the security segmentation methods described herein.

In an approach, large lookup tables (e.g., large forwarding/routing lookup tables) are utilized to assign packets to particular security segments based upon network parameters in the packets matched by the tables. The parameters may include source and/or destination addresses (e.g., exact or subnet addresses) in the packet headers or other parameters (e.g., protocol, ports) used for implementing network security policy. Large lookup tables may be implemented in generally allocated memory (e.g., RAM) to perform the segment assignments and may be used to significantly scale up security processing (e.g., ACL programming). In some approaches, packets/flows with different source/destination parameters may be grouped into common security segments based upon their respective/common security policies.

After security segments are assigned to packets/flows with particular (e.g., common) parameters, the packets may be further processed in compact/dedicated memory tables based upon their assigned security segments. Keys in the compact/dedicated memory tables (e.g., CAM/TCAM) may be, for example, security segment identifiers wherein matches to the assigned segments allow or deny particular network processing tasks (e.g., forwarding) involving the identified segments. For example, an entry may indicate permission that matching packets may be sent from a specified source security segment to a specified destination security segment. Because different packets with various network parameters may be grouped into common security segments, fewer security entries may be required than is necessary when a CAM/TCAM lookup entry is programmed for each of variously parameterized packets/flows.

Some network policies are intended to process traffic according to particular IP addresses, ports, and/or protocols. In addition to specifying that a source segment can send packets to a destination segment, a policy might specify that only packets destined for a particular port should be allowed for the traffic sent from a source to a destination security segment. When doing so in approaches using the security segments described herein, the final lookup that determines the result (e.g., allow/drop/redirect/elevate processing) can include parameters including the IP protocol and TCP port values obtained from the packet, and matched against entries in the table. Approaches as described herein are well suited to applying such policies when they are applied using a TCAM. An entry in the TCAM may have fields such as, for example, {source segment, destination segment, IP protocol, TCP destination port} with values such as {SEG-1, SEG-2, TCP, 80} where SEG-1 and SEG-2 are source and destination segments, respectively, the protocol is TCP, and TCP header destination port field value is 80.

In an approach, a table lookup entry for a particular network address may be configured to perform both one or more security segment identifications and a function separate from the segment assignment(s). In some embodiments, large lookup tables may already include entries for particular lookup functions (e.g., forwarding address lookup, quality of service (QoS) designation) that have overlapping match criteria (e.g., "exact match" and/or "longest prefix" match lookup fields such as for identifying low priority packets) with the assignment of security segments. In some embodiments, segment assignment may be paired with particular large lookup table entries pertaining to corresponding security policies (e.g., in a media access control (MAC) address table, IPv4 routing table, and/or IPv6 table) and/or for processing at least one of a packet forwarding function, packet routing function, unicast reverse path forwarding function, and/or QoS function.

In some embodiments, once a security segment identification is made, one or more security segment identifiers (e.g., source and destination) may be assigned to a packet.

Further processing of the packets according to their security segment identification(s) may be performed in separate, more compact, and/or more quickly searched tables including, for example, those implemented in CAMs and TCAMs. For example, an entry in a TCAM table where a key includes a particular source security segment identifier and destination security segment identifier may route corresponding/matched packets according to the large table matches only if they are permitted by the security segmentation rules in the CAM/TCAM table. Those forwarding actions denied by a particular segmentation lookup may result in a packet being dropped instead of being forwarded. That way, packets corresponding to a plurality of different source and destination addresses that would ordinarily require multiple entries (e.g., according to an ACL) may be securely processed using fewer entries in a table that is flexible but limited in size (e.g., in a CAM/TCAM).

In addition to or as an alternative to processing forwarding functions, the segmentation lookup may also be associated with permitting or denying access of the packet to a particular destination, a rate-limiting decision, implementing a QoS policy, implementing further analysis of the packet, and/or for selecting an output interface (e.g., port). Such policies/processing may be parsed from one or more ACLs and/or other forwarding policy configuration objects.

In some approaches, the types of "large" tables designated for assigning security segments may depend on their then-present use at the time of allocation and the underlying network conditions/topology. As indicated earlier, tables used for "longest prefix match" or "exact match" lookups may also be utilized for security segment assignments. An "exact match" lookup is typically used for performing a particular action based upon a complete or nearly complete network address. Such entries are generally used where a particular/specialized action is programmed for specific addresses.

Accordingly, in some embodiments, where particular security segments are assigned based upon complete network addresses, larger tables already used for exact addresses may be concurrently utilized to assign security segments. In some approaches, the security segments are assigned using a combination of different types of tables and/or memory components (e.g., RAM/TCAM). In an approach, the assignment of security segments may piggyback on already programmed table entries used for other network processing functions. In some embodiments, the piggybacking may occur in a media access control (MAC) address table, IPv4 routing table, and/or IPv6 routing table. In some embodiments, the entries are configured to process at least one of a packet forwarding function, packet routing function, unicast reverse path forwarding function, and/or QoS function.

In some network configurations, partial match (e.g., LPM) entries in tables may be heavily utilized for looking up routing paths based upon destination addresses and/or utilized for IP source lookups to implement a "unicast reverse path forwarding" feature, for example. In an example, a partial match (e.g., a subnet identifier) may be utilized to determine that a packet should be forwarded through a particular route/node. In such instances, approaches herein may capitalize on the partial match entries to collaterally assign security segments to groups of packets with these partial matches.

Accordingly, in some approaches, both partial match lookup tables and exact match lookup tables and their entries may overlap processing of some groups of packets and in assigning security segments. Where there is a match in both types of tables or entries in the same table for the same packet, an approach selects the (more specific) result from the exact match lookup table/entry and overrides the partial match entry to assign a security segment to the packet. The approach provides flexibility for assigning particular security segments to classes of packets intended for general destinations while refining the assignment when actions are based upon a more specific (exact) destination.

FIG. 1 is a block diagram of a network device configured to perform segmentation processing according to some embodiments. A network device 100 includes a network interface 150 for receiving and transmitting packets through an input 160 and output 170, respectively. A control circuitry 115 includes a processing circuitry 120 for processing incoming and outgoing packets. Processing incoming packets includes performing a lookup of packet parameters in one or more "large" forwarding tables 135 stored in general and/or dedicated memory 130 (e.g., RAM and/or TCAM memory). Based upon lookups in the large tables (e.g., tables 200 and 220 of FIG. 2A and B), packets are assigned to security segments (e.g., source and/or destination security segments).

Based upon parameters obtained from a packet and the results of the large forwarding table 135 lookups, including the resulting security segment assignments, security segment lookups are performed using at least one security segment lookup table 145 located in a dedicated memory table 140 (e.g., TCAM/CAM). Security segment lookup table 145 may be used in some embodiments for determining whether to forward the packet, to count the packet, to log the packet, to mirror the packet, to rate limit matching packets, to change QoS handling of the packet, and/or to change a forwarding destination of the packet.

FIG. 2A is an exemplary forwarding table for assigning source security segments according to some embodiments. FIG. 2B is an exemplary forwarding table for assigning destination security segments according to some embodiments. FIG. 2C is an exemplary security segment lookup table according to some embodiments. Lookup table sections 200 and 220 include entries for a source IP address in column 210 and a destination IP address in column 230. The source and destination IP addresses may be obtained from an incoming packet (e.g., received at input port 160 of FIG. 1). A match with source and destination IP entries in columns 210 and 220 results in an assignment to source and destination security segments designated in columns 215 and 235, respectively. Lookup table sections 200 and 220 may be standalone tables or components of larger lookup tables, for example, a forwarding information base residing in RAM or in a combination of RAM and a dedicated table memory (e.g., CAM/TCAM).

A security segment table 240 is configured to perform lookups based upon security segment assignments 250, 255. Table 240 may be located in dedicated memory (e.g., TCAM memory 140 of FIG. 1). Table 240 may also include entries for additional parameters such as a network protocol parameter 260 and port parameter 265. These parameters may be obtained from associated packets and/or as a result of lookups performed in large tables (e.g., including tables 200 and 220). In some embodiments, lookups in table 240 are performed to confirm, deny, or advance packet processing tasks initiated from lookups in tables 200 and 220. These tasks may include, for example, allowing or dropping the packet, applying a rate limiter to the packet, applying a quality of service policy to the packet, mirroring the packet, counting the packet, logging the packet, selecting an output interface for the packet, or implementing further analysis of the packet such as further described herein.

Figure 3:
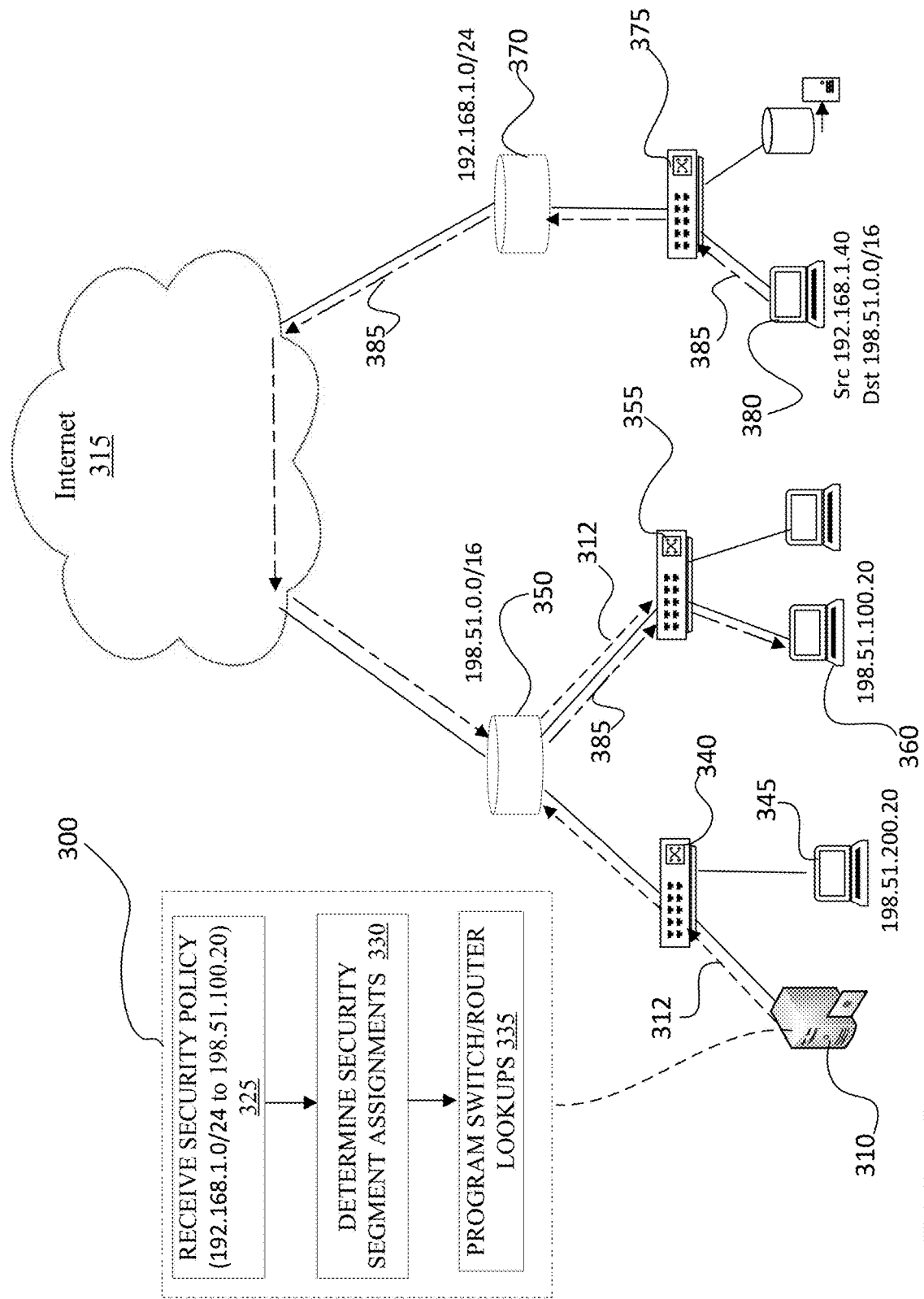
FIG. 3 is an exemplary network topology performing segmentation processing according to some embodiments.

FIG. 3 is an exemplary network topology performing segmentation processing according to some embodiments. A network server 310 is programmed and configured to receive and program network configuration settings such as, for example, for managing network traffic including implementing security, forwarding, and traffic prioritization settings. An exemplary processing flow 300 at server 310 includes receiving security policies at block 325. The security policies may be received in the form of a file or records identifying traffic flow permissions/policies between different segments of a network or networks (e.g., identified by network addresses). In some embodiments, the received policies may include one or more ACLs.

For example, an exemplary configuration may be arranged as follows, including a section with a set of structured "match lists" that specify associated prefixes and hosts. A "definition" section specifies a match list holding the prefixes that define the security segment. A "policies" section specifies the action to take when a packet is being forwarded from the given security segment to another security segment:

```
match-list input prefix-ipv4 match0
   match prefix-ipv4 10.1.0.0/24
match-list input prefix-ipv4 match1
   match prefix-ipv4 10.1.1.2/32
   match prefix-ipv4 10.1.1.4/32
   match prefix-ipv4 10.1.1.3/32
match-list input prefix-ipv4 match2
   match prefix-ipv4 10.1.2.4/32
   match prefix-ipv4 10.1.2.3/32
   match prefix-ipv4 10.1.2.2/32
match-list input prefix-ipv4 match3
   match prefix-ipv4 10.1.3.4/32
   match prefix-ipv4 10.1.3.2/32
   match prefix-ipv4 10.1.3.3/32
router segment-security
   no shutdown
   vrf default
     segment seg0
        definition
           match prefix-ipv4 match0
        policies
           from seg2 policy policy-forward-all
           from seg3 policy policy-drop-all
           from seg1 policy policy-forward-all
     segment seg1
        definition
           match prefix-ipv4 match1
        policies
           from seg2 policy policy-drop-all
           from seg3 policy policy-forward-all
           from seg0 policy policy-forward-all
     segment seg2
        definition
           match prefix-ipv4 match2
        policies
           from seg3 policy policy-forward-all
           from seg0 policy policy-drop-all
           from seg1 policy policy-drop-all
     segment seg3
        definition
           match prefix-ipv4 match3
        policies
           from seg2 policy policy-drop-all
           from seg0 policy policy-forward-all
           from seg1 policy policy-forward-all
```

One of the received policies permits the flow of traffic from an IP address subnet 192.168.1.0/24 to a destination address 198.51.100.20. At block 330, source and destination security segments are established based upon the policies received at block 325. For example, a source security segment is established to include the IP address subnet parameter (192.168.1.0/24) and a destination security segment is established to include the destination address (198.51.100.20) based upon a policy received at block 325. Security segment assignments may be maintained in a memory table such as in the memory of server 310 and/or a connected data storage system.

Based upon the security policies and security segment assignments, forwarding and other network processing tables (e.g., FIBs) are programmed at block 335 via control signals 312 in network devices 340, 350, and 355 within a local area network. Router 350, switch 340, and switch 355 are programmed with one or more FIB tables including portions programmed for executing security segment assignments (e.g., similar to table segments 200 and 220 of FIGS. 2A and 2B). The security segment assignment portions are programmed to assign packets to respective source and destination security segments. For example, entries may be programmed to assign packets with source addresses within subnet 192.168.1.9/24 to the respective above-described source security segment. Entries are also programmed to assign packets with a destination address 198.51.100.20 to the respective above described destination security segment. As described in some embodiments herein, these assignments may "piggyback" on other portions of forwarding (e.g., FIB) tables and other network processing tables in the respective devices.

After the exemplary programming described above, a packet flow 385 arrives at router 350 via internet 315, router 370, and switch 375 from a device 380 having a source network subnet 192.168.1.0/24, in which the flow is directed to a destination subnet 198.51.0.0/16 with the specific destination 198.51.200.20 (the IPv4 address of a network device 345). Upon receipt of the flow at router 350, router 350 performs at least one lookup in a table that assigns packets to the source and destination security segments described above. Router 350 then performs one or more security segment lookups based upon the assigned source and destination security segments (e.g., in a CAM/TCAM) that determines whether forwarding packets from the flow and other processing functions (e.g., based on the initial lookups) are permitted to proceed. Based upon the additional lookup(s), packets from flow 385 are forwarded to network switches 340 and 355 and additional processing may proceed depending upon results of the security segment lookups.

Because switch 340 is not configured to permit forwarding to a destination security segment associated with packet flow 385, switch 340 is not programmed with a corresponding security segment table entry (e.g., alike to an entry in table 240 of FIG. 2C) permitting the forwarding of such packets, and thus packets from flow 385 are not permitted to be forwarded by switch 340.

Switch 355 is connected to device 360 with IP address 198.51.100.20 and, based upon the policies received at 325, is programmed with a security segment table to permit the forwarding of packets with a destination security segment including device 360 and source security segment of device 380. Thus, packets from flow 385 are permitted to be forwarded to device 360 after a lookup in the respective security segment tables of switch 355.

Figure 4:
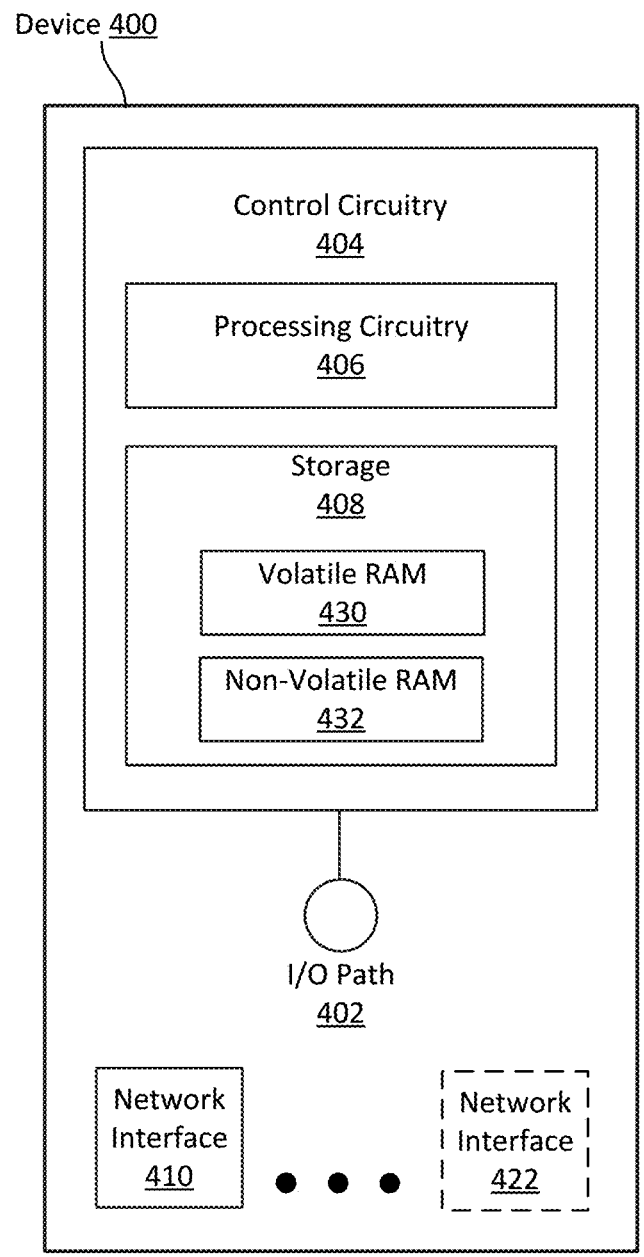
FIG. 4 is a block diagram of a network device configured to perform segmentation processing according to some embodiments.

FIG. 4 is a block diagram of a network device configured to perform segmentation processing according to some embodiments. As depicted, a segmentation-processing network device 400 may be a router, switch, server, and/or any other computing device that may be configured to control and/or process network traffic. The segmentation-processing network 400 may receive data, including packets, via an input/output (I/O) path 402. I/O path 402 may provide packet data to control circuitry 404, which includes processing circuitry 406 and storage (or memory) 408. Control circuitry 404 may send and receive commands, requests, and other suitable data using I/O path 402. I/O path 402 may connect control circuitry 404 (and specifically processing circuitry 406) to one or more network interfaces 410, . . . , 422, which in turn connect segmentation processing device 400 to one or more other devices of a network (e.g., devices shown in FIG. 3).

Control circuitry 404 may be based on any suitable processing circuitry, such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, octa-core, or any suitable number of cores). In some embodiments, processing circuitry is distributed across multiple separate processors or processing units, for example, multiple of the same type of processing units (e.g., two INTEL CORE i7 processors) or multiple different processors (e.g., an INTEL CORE i5 processor and an INTEL CORE i7 processor). In some embodiments, control circuitry 404 executes instructions for programming and/or performing security segment lookups in tables stored in memory (i.e., storage 408), and performing related network processing functions including, for example, allowing or dropping the packet, applying a rate limiter to the packet, applying a quality of service policy to the packet, mirroring the packet, counting the packet, logging the packet, selecting an output interface for the packet, or implementing further analysis of the packet. Control circuitry 404 may further cause the forwarding of packets via one or more network interfaces 410, . . . , 422.

The memory may be an electronic storage device provided as storage 408 that is part of control circuitry 404. As referred to herein, the phrase "electronic storage device" or "storage device" should be understood to mean any device for storing electronic data, computer software, instructions, and/or firmware, such as random-access memory, content-addressable memory, hard drives, optical drives, solid state devices, quantum storage devices, or any other suitable fixed or removable storage devices, and/or any combination of the same. Nonvolatile memory may also be used. The circuitry described herein may execute instructions included in software running on one or more general purpose or specialized processors. Multiple circuits may be provided to handle simultaneous processing functions.

Figure 5:
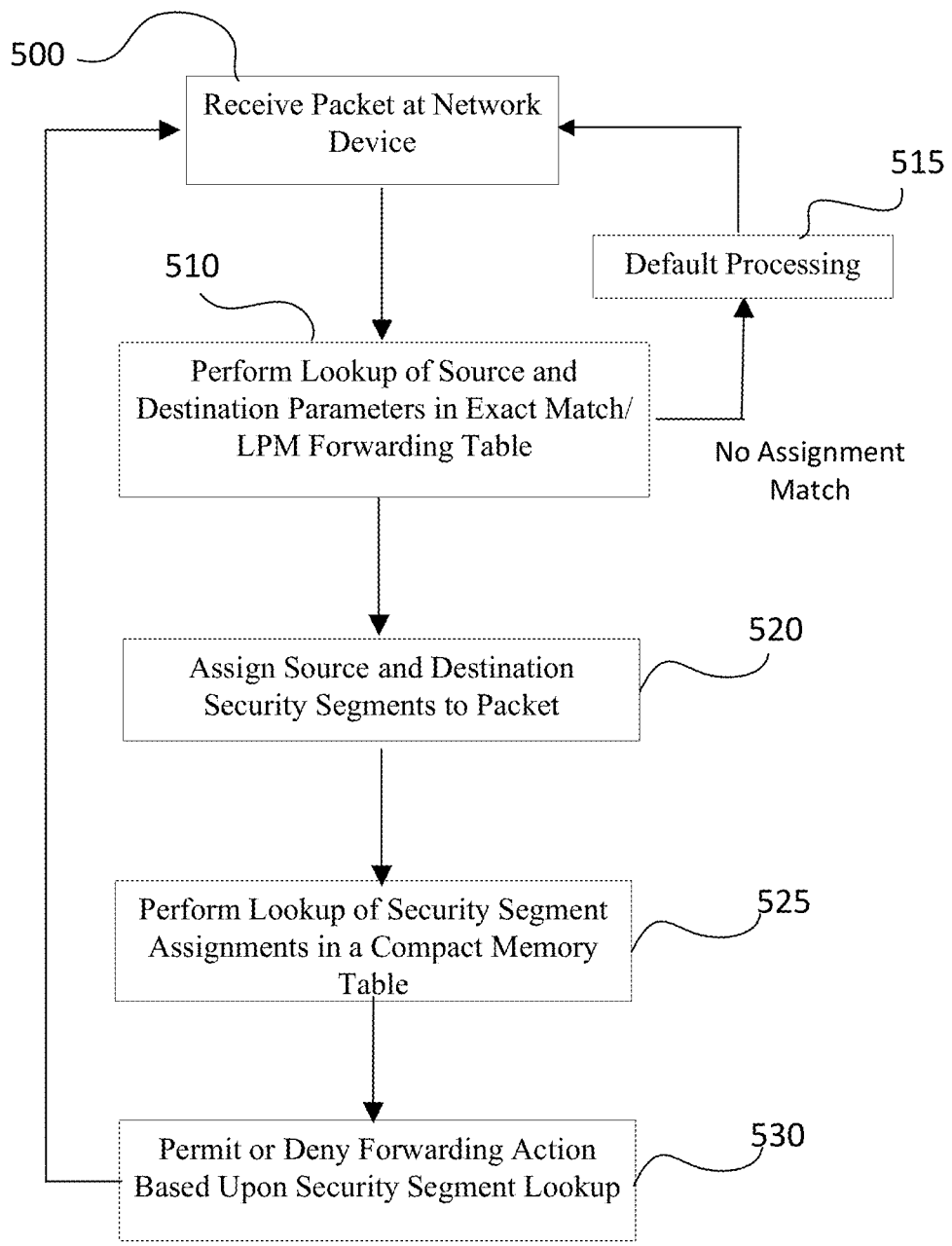
FIG. 5 is a flowchart of segmentation processing according to some embodiments.

FIG. 5 is a flowchart of segmentation processing according to some embodiments. At block 500, network packets are received at a network device (e.g., network device 100 of FIG. 1, network device 310 of FIG. 3, and/or network device 400 of FIG. 4). At block 510, one or more initial lookups are performed in one or more exact-match/LPM tables in which source and destination security segments may be assigned (e.g., similar to assignments in lookup table sections 200 and 220) based upon parameters (e.g., MAC, IPv4, IPv6 addresses) obtained from respective packets. Where no security segment assignments are applicable, default processing may occur at block 515 (e.g., the packet is dropped).

At block 520, when initial lookups performed at block 510 result in matches between packet parameters and source and destination security segments, the respective source and destination security segments are assigned to the respective packets. At block 525, security segment lookups are performed for the packets based upon the assigned source and destination security segments. The security segment lookups may include additional parameters (e.g., port, protocol, etc.) such as based upon parameters included in the respective packets and/or results of the initial lookups. In some embodiments, the further lookups are performed in dedicated memory tables (e.g., CAM/TCAM) which may permit matching to be performed in parallel.

At block 530, network processing initiated from the initial lookups is further administered based upon the security segment lookups. The security segment lookups may determine whether to allow or drop the packet, apply a rate limiter to the packet, apply a quality of service policy to the packet, mirror the packet, count the packet, log the packet, select an output interface for the packet, or implement further analysis of the packet such as further described herein.

Figure 6:
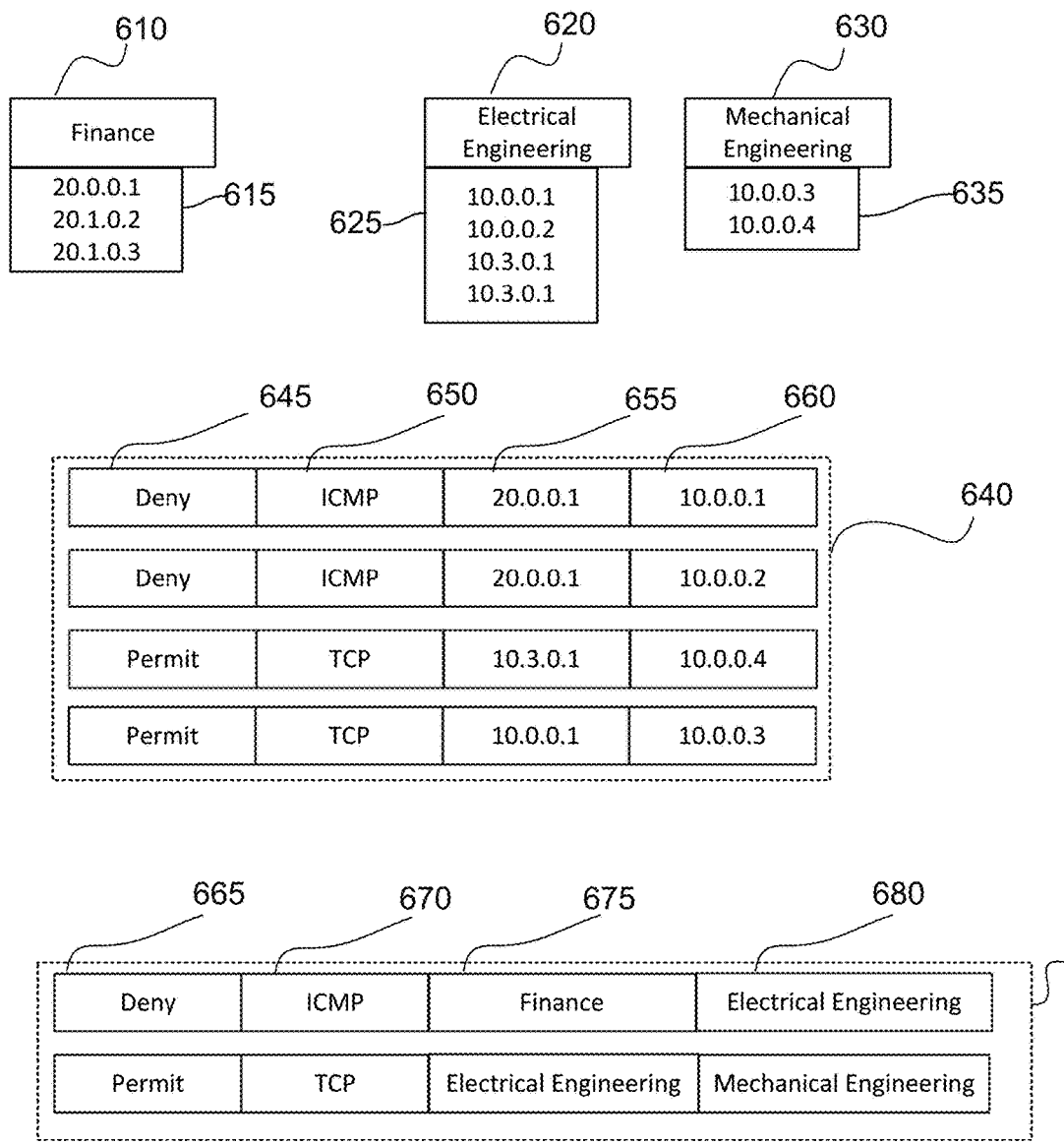
FIG. 6 shows a collection of exemplary tables used for performing segmentation processing according to some embodiments.

FIG. 6 shows a collection of exemplary tables used for performing segmentation processing according to some embodiments. Tables 610, 620, and 630 identify sets 615, 625, and 635, respectively, of IP addresses associated with particular security segments (i.e., "Finance," "Electrical Engineering," and "Mechanical Engineering"). The security segments may be identified with particular segments/devices within a network and/or particular groups of users.

Table 640 represents a set of network policies such as obtained from security policy such as described. Columns 650, 655, and 660 represent parameters including a protocol, source IP address, and destination IP address, respectively. Column 645 represents a forwarding policy decision result (i.e., deny or permit) from a lookup of the respective combination of parameters. Based upon the security segment assignments of tables 610, 620, and 630, the network policies of table 640 can be consolidated into security segment lookup table 660 and implemented in a dedicated memory table (e.g., a TCAM).

The combination of parameters including a network protocol in column 670, a source security segment in column 675, and destination security segment in column 680 can be looked up to result in a policy decision in a result column 665. Various network processing functions such as described herein can be initiated in regular (e.g., FIB) tables, wherein the assignments of tables 610, 620, and 630 can also be piggybacked, and administered by table 660 as described.

Figure 7:
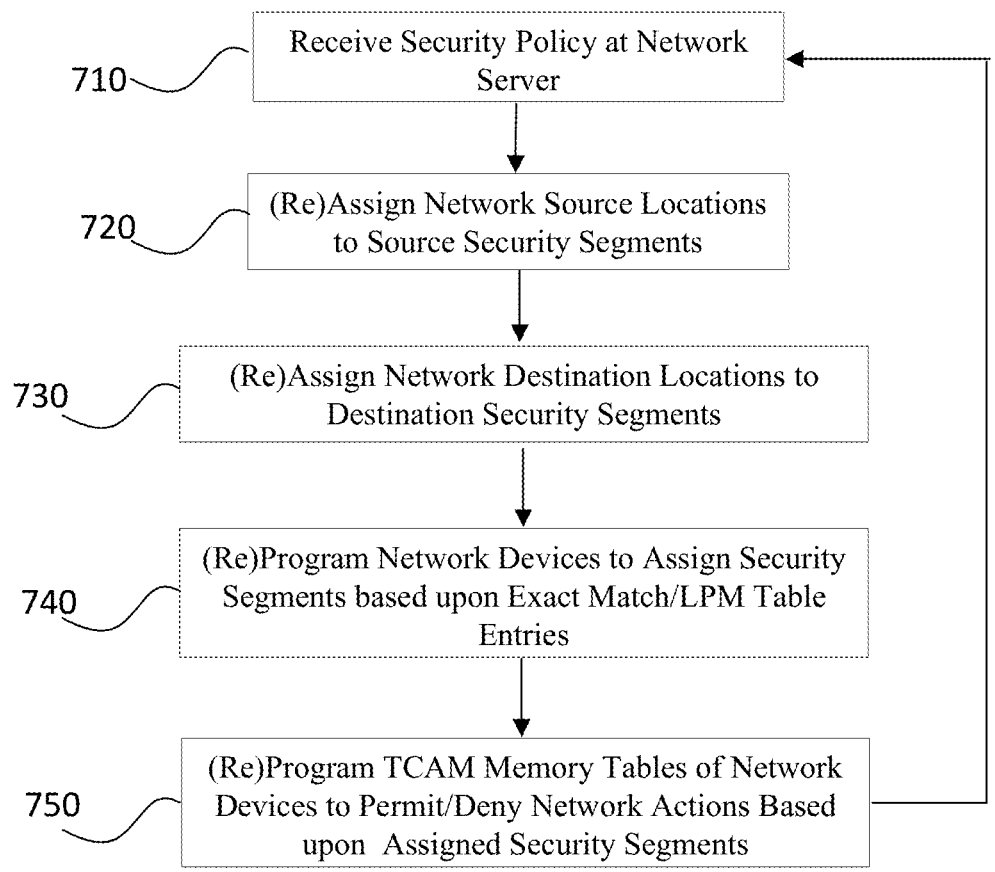
FIG. 7 is a flowchart of assigning segments and programming tables in network devices for performing segmentation processing according to some embodiments.

FIG. 7 is a flowchart of assigning segments and programming tables in network devices for performing segmentation processing according to some embodiments. At block 710, network security policies (e.g., in the form of ACLs) are received such as at a network server (e.g., network server 310 of FIG. 3). Based upon the policies, different network locations, devices, and/or users may be mapped/assigned to particular security segments (e.g., tables 610, 620, and 630 of FIG. 6), including source security segments at block 720 and destination security segments at block 730.

At block 740, large network processing tables (e.g., FIBs in regular and TCAM memory) are reprogrammed to piggyback security segment assignments with other table entries. Other table entries may be associated with, for example, allowing or dropping the packet, applying a rate limiter to the packet, applying a quality of service policy to the packet, mirroring the packet, counting the packet, logging the packet, selecting an output interface for the packet, or implementing further analysis of the packet. At block 750, dedicated memory tables are programmed with security segment lookups used to further process, if needed, the processing functions programmed at block 740.

Figure 8A:
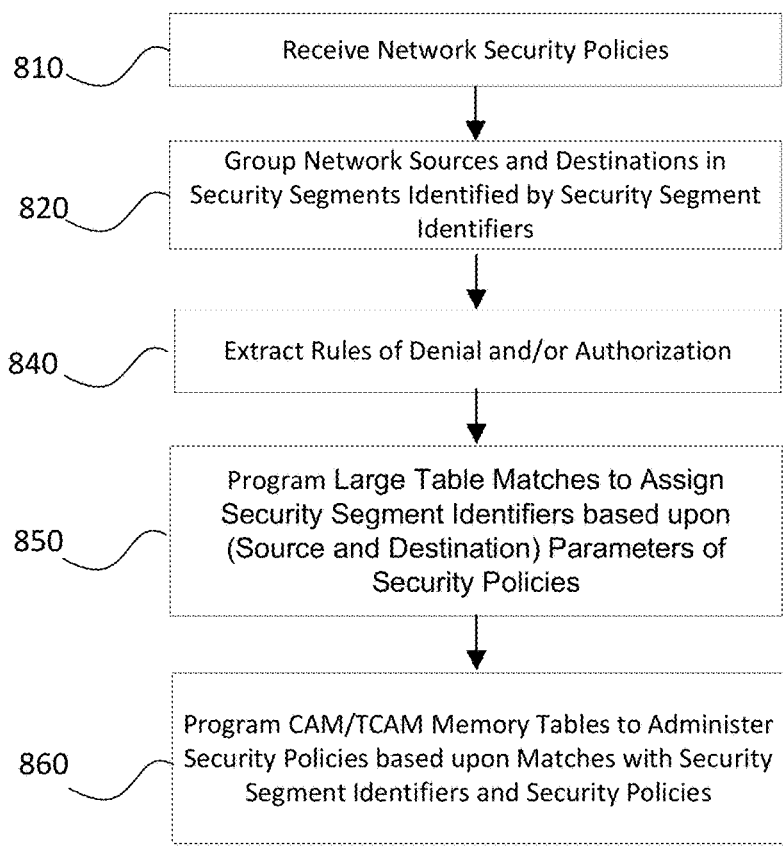
FIG. 8A is a flowchart for assigning security segments and programming lookup tables according to some embodiments.
Figure 8B:
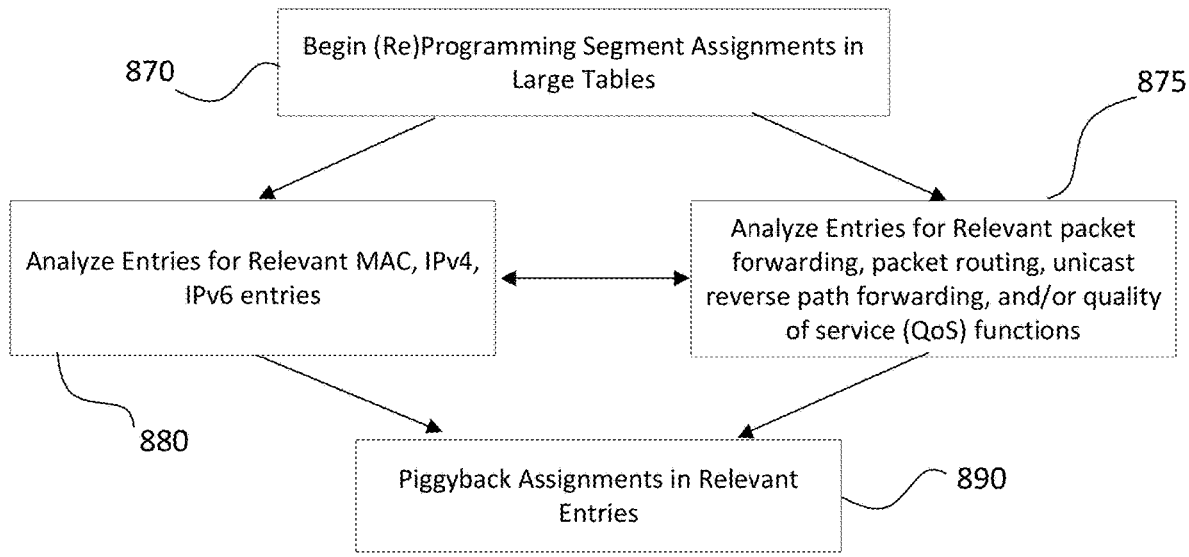
FIG. 8B is a flowchart for assigning security segments in large lookup tables according to some embodiments.

FIG. 8A is a flowchart for assigning security segments and programming lookup tables according to some embodiments. FIG. 8B is a flowchart for assigning security segments in large lookup tables according to some embodiments. At block 810, network security policies are received such as at a network server (e.g., network server 310 of FIG. 3). At block 820, based upon the policies, different network locations, devices, and/or users may be mapped to particular security segments (e.g., tables 610, 620, and 630 of FIG. 6). Based upon the security policies, additional applicable network parameters may be determined including, for example, protocols, ports, etc. At block 840, specific policy rules (e.g., denial or permission of particular actions) are extracted from the policies received at block 810.

At block 850, large network processing tables (e.g., FIBs in regular and TCAM memory) are programmed to initiate network actions (e.g., forwarding a packet with particular parameters) and to assign security segments to respective packets. As described herein, these large tables may combine policy actions and assignments in respective lookup entries. At block 860, dedicated memory tables (e.g., CAM/TCAM tables) are programmed to issue determinations (e.g., permission/denial) on actions initiated from lookups in the large tables.

In some embodiments, at block 870, a process for programming or reprogramming large lookup tables includes analyzing the tables for corresponding network functions such as packet forwarding, packet routing, unicast reverse path forwarding, and/or quality of service (QoS) functions. The analyzing may include determining which functions correspond to sources, destinations, ports, protocols, and/or user accounts pertaining to network security policies such as received at block 810. Further analysis includes analyzing, at blocks 880 and 875, which of the network policies (e.g., packet forwarding, packet routing, unicast reverse path forwarding, etc.) and parameters (e.g., MAC, IPv4, IPv6 addresses) in the large table(s) correspond to assigned security segments such as assigned at block 820.

At block 890, large table entries may be updated to include a piggybacking security segment assignment for packets with parameters (e.g., source and destination addresses) corresponding to respective source and destination security segments. FIG. 8C is an exemplary forwarding table programmed for assigning security segments according to some embodiments. Assigning some source security segments may "piggyback" on table entries also programmed for performing packet counting, for example, and follow-up table lookups. Assigning some destination security segments may "piggyback" on table entries, for example, programmed for assigning destination ports.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for processing network communications, the method comprising:
    receiving a network packet at a network device;
    performing at least one lookup for the packet in one or more first lookup tables wherein the one or more first lookup tables are programmed to include at least one of an exact match or longest prefix match (LPM) table entry;
    obtaining a source security segment identifier and a destination security segment identifier from the at least one lookup for the packet in the one or more first lookup tables;
    using the source security segment identifier and the destination security segment identifier to perform a lookup in a second consolidated lookup table, wherein the second consolidated lookup table is programmed in a content addressable memory (CAM); and
    based, at least in part, upon a result of the lookup in the second consolidated lookup table, determining a forwarding decision for the packet.

2. A computer implemented method for processing network communications, the method comprising:
    receiving a packet at a network device;
    performing at least one lookup for the packet in one or more first lookup tables;

obtaining a source security segment identifier and a destination security segment identifier directly from the at least one lookup for the packet in the one or more first lookup tables;

using the source security segment identifier and the destination security segment identifier to perform a lookup in a second compact lookup table; and processing the packet in response to a result of performing the lookup in the second compact lookup table.

3. The method of claim 2 wherein the second compact lookup table includes lookup entries representing the source security segment identifier and the destination security segment identifier; and wherein looking up the packet in the second compact lookup table comprises comparing the obtained source security segment identifier and the obtained destination security segment identifier with the lookup entries of the second compact lookup table.

4. The method of claim 2 wherein at least a portion of the one or more first lookup tables resides in a random access memory (RAM) and the second compact lookup table resides in at least one of a content addressable memory (CAM) or a ternary content addressable memory (TCAM).

5. The method of claim 2 wherein the at least one lookup for the packet comprises:

looking up a source network address obtained from the packet and determining that the source network address corresponds to at least one network address from a first set of network addresses associated with the source security segment identifier; and looking up a destination network address obtained from the packet and determining that the destination network address corresponds to at least one network address from a second set of network addresses associated with the obtained destination security segment identifier.

6. The method of claim 2 wherein, based upon the result of the lookup in the second compact lookup table, determining a forwarding decision for the packet.

7. The method of claim 6 wherein determining a forwarding decision for the packet comprises at least one of a decision to forward the packet, to count the packet, to log the packet, to mirror the packet, to rate limit matching packets, to change quality of service (QoS) handling of the packet, or to change a forwarding destination for the packet.

8. The method of claim 5 wherein at least one of the first set of network addresses and the second set of network addresses comprises a network subnet address.

9. The method of claim 2 wherein at least one of the source security segment identifier or the destination security segment identifier is obtained in response to at least one match in a table entry corresponding to at least one network processing function apart from assigning security segments and wherein the table entry comprises at least one of an exact match or longest prefix match (LPM) table entry.

10. The method of claim 9 wherein the at least one match in the table entry is at least one from a media access control (MAC) address table, IPv4 routing table, or IPv6 routing table.

11. The method of claim 9 wherein the at least one network processing function apart from the assigning comprises at least one of a packet forwarding function, packet routing function, unicast reverse path forwarding function, or quality of service (QoS) function.

12. The method of claim 2 wherein the one or more first lookup tables comprises a first entry and a second entry for assigning at least one of the source security segment identifier or the destination security segment identifier, the first entry comprising an exact match table entry and the second entry comprising a longest prefix match (LPM) table entry, wherein at least one of the security assignments for the first entry override at least one of the security assignments for the second entry based upon a prioritizing of exact match entries over LPM table entries.

13. The method of claim 2 wherein the result represents at least one of allowing or dropping the packet, applying a rate limiter to the packet, applying a quality of service policy to the packet, mirroring the packet, counting the packet, logging the packet, selecting an output interface for the packet, or implementing further analysis of the packet.

14. The method of claim 2 further comprising:

obtaining one or more access control lists (ACLs); and programming entries in the second compact lookup table with a match criteria based upon at least one of the source security segment identifier or the destination security segment identifier and further based upon at least one criteria corresponding to a policy of the one or more ACLs.

15. The method of claim 14 wherein the match criteria in the second compact lookup table further comprises a parameter for at least one of determining a decision to forward the packet, to count the packet, to log the packet, to mirror the packet, to rate limit matching packets, to change quality of service (QoS) handling of the packet, or to change a forwarding destination of the packet.

16. The method of claim 14 wherein the match criteria in the second compact lookup table further comprises a parameter for at least one of determining a decision to forward the packet, to count the packet, to log the packet, to mirror the packet, to rate limit matching packets, to change quality of service (QoS) handling of the packet, or to change a forwarding destination of the packet.

17. A system for processing network communications, the system comprising:

one or more network devices programmed and configured to cause one or more processors to perform:

receiving a packet at the one or more network devices;

performing at least one lookup for the packet in one or more first lookup tables;

obtaining a source security segment identifier and a destination security segment identifier from the one or more first lookup tables;

using the source security segment identifier and the destination security segment identifier to perform a lookup in a consolidated security segment lookup table; and processing the packet in response to a result of performing the lookup in the consolidated security segment lookup table.

18. The system of claim 17 wherein the consolidated security segment lookup table includes lookup entries representing the source security segment identifier and the destination security segment identifier; and wherein looking up the packet in the consolidated security segment lookup table comprises comparing the obtained source security segment identifier and the obtained destination security segment identifier with the lookup entries of the consolidated security segment lookup table.

19. The system of claim 17 wherein at least a portion of the one or more first lookup tables resides in a random access memory (RAM) and the consolidated security segment lookup table resides in at least one of a content addressable memory (CAM) or a ternary content addressable memory (TCAM).

20. The system of claim 17 wherein the at least one lookup for the packet comprises:
- looking up a source network address obtained from the packet and determining that the source network address corresponds to at least one network address from a first set of network addresses associated with the obtained source security segment identifier; and
- looking up a destination network address obtained from the packet and determining that the destination network address corresponds to at least one network address from a second set of network addresses associated with the obtained destination security segment identifier.

21. The system of claim 17 wherein, based upon the result of the lookup in the consolidated security segment lookup table, determining a forwarding decision for the packet.

22. The system of claim 21 wherein determining a forwarding decision for the packet comprises at least one of a decision to forward the packet, to count the packet, to log the packet, to mirror the packet, to rate limit matching packets, to change quality of service (QoS) handling of the packet, or to change a forwarding destination for the packet.

23. The system of claim 20 wherein at least one of the first set of network addresses and the second set of network addresses comprises a network subnet address.

24. The system of claim 17 wherein at least one of the source security segment identifier or the destination security segment identifier are obtained in response to at least one match in a table entry corresponding to at least one network processing function apart from assigning security segments and wherein the table entry comprises at least one of an exact match or longest prefix match (LPM) table entry.

25. The system of claim 24 wherein the at least one match in the table entry is at least one from a media access control (MAC) address table, IPv4 routing table, or IPv6 routing table.

26. The system of claim 24 wherein the at least one network processing function apart from the assigning comprises at least one of a packet forwarding function, packet routing function, unicast reverse path forwarding function, or quality of service (QoS) function.

27. The system of claim 17 wherein the one or more first lookup tables comprises a first entry and a second entry for assigning at least one of the source security segment identifier or the destination security segment identifier, the first entry comprising an exact match table entry and the second entry comprising a longest prefix match (LPM) table entry, wherein at least one of the security assignments for the first entry override at least one of the security assignments for the second entry based upon a prioritizing of exact match entries over LPM table entries.

28. The system of claim 17 wherein the result represents at least one of allowing or dropping the packet, applying a rate limiter to the packet, applying a quality of service policy to the packet, mirroring the packet, counting the packet, logging the packet, selecting an output interface for the packet, or implementing further analysis of the packet.

29. The system of claim 17 further comprising:
- obtaining one or more access control lists (ACLs); and
- programming entries in the consolidated security segment lookup table with a match criteria based upon at least one of the source security segment identifier or the destination security segment identifier and further based upon at least one criteria corresponding to a policy of the one or more ACLs.

30. The system of claim 29 wherein the match criteria in the consolidated security segment lookup table further comprises a parameter for at least one of determining a decision to forward the packet, to count the packet, to log the packet, to mirror the packet, to rate limit matching packets, to change quality of service (QoS) handling of the packet, or to change a forwarding destination of the packet.

* * * * *